United States Patent
Brockway et al.

(10) Patent No.: US 6,456,288 B1
(45) Date of Patent: Sep. 24, 2002

(54) METHOD AND APPARATUS FOR BUILDING A REAL TIME GRAPHIC SCENE DATABASE HAVING INCREASED RESOLUTION AND IMPROVED RENDERING SPEED

(75) Inventors: Dan E Brockway; Charles B. Walters; Michael E Weiblen, all of Dallas; Richard M. McDonald, Coppell, all of TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/052,565

(22) Filed: Mar. 31, 1998

(51) Int. Cl.[7] .............................................. G06T 17/00
(52) U.S. Cl. ...................................... 345/428; 345/848
(58) Field of Search ................................ 345/430, 425, 345/428, 582, 619, 848, 850

(56) References Cited

U.S. PATENT DOCUMENTS

| | | | |
|---|---|---|---|
| 5,187,754 A | * | 2/1993 | Currin et al. ................. 382/54 |
| 5,317,689 A | * | 5/1994 | Nack et al. ................... 395/163 |
| 5,504,847 A | * | 4/1996 | Kimura et al. ............... 395/133 |
| 5,579,456 A | * | 11/1996 | Cosman ....................... 395/128 |
| 5,696,892 A | * | 12/1997 | Redmann et al. ........... 395/125 |
| 5,995,110 A | * | 11/1999 | Litwinowicz ................ 345/425 |
| 6,058,397 A | * | 5/2000 | Barrus et al. ................ 707/104 |
| 6,064,389 A | * | 5/2000 | Berry et al. .................. 345/419 |

* cited by examiner

Primary Examiner—Mark Zimmerman
Assistant Examiner—Mano Padmanabhan
(74) Attorney, Agent, or Firm—Baker Botts L.L.P.

(57) ABSTRACT

A database generated off-line containing high-resolution models incorporated into source imagery. The method and apparatus builds a data intensive scene representation and renders it off-line, captures an orthographic projection of the rendered scene and stores it as a pixel representation of the rendered imagery and models. The pixel representation is stored in a database for rendering in real time. The resulting database can be rendered more efficiently in real time than databases built using previously known techniques. The database provides improved resolution and improved rendering performance. Resolution is enhanced by generating and placing images of higher-resolution models onto lower-resolution models. Performance is enhanced by reducing the number of polygons that must be rendered in real time to represent a scene. The method and apparatus provides an orthographic rendering of a scene wherein images of high-resolution models (SPLOT models) have been inserted into lower-resolution source imagery. The resulting rendered representation of a scene is stored in a database for rendering in real time.

30 Claims, 18 Drawing Sheets

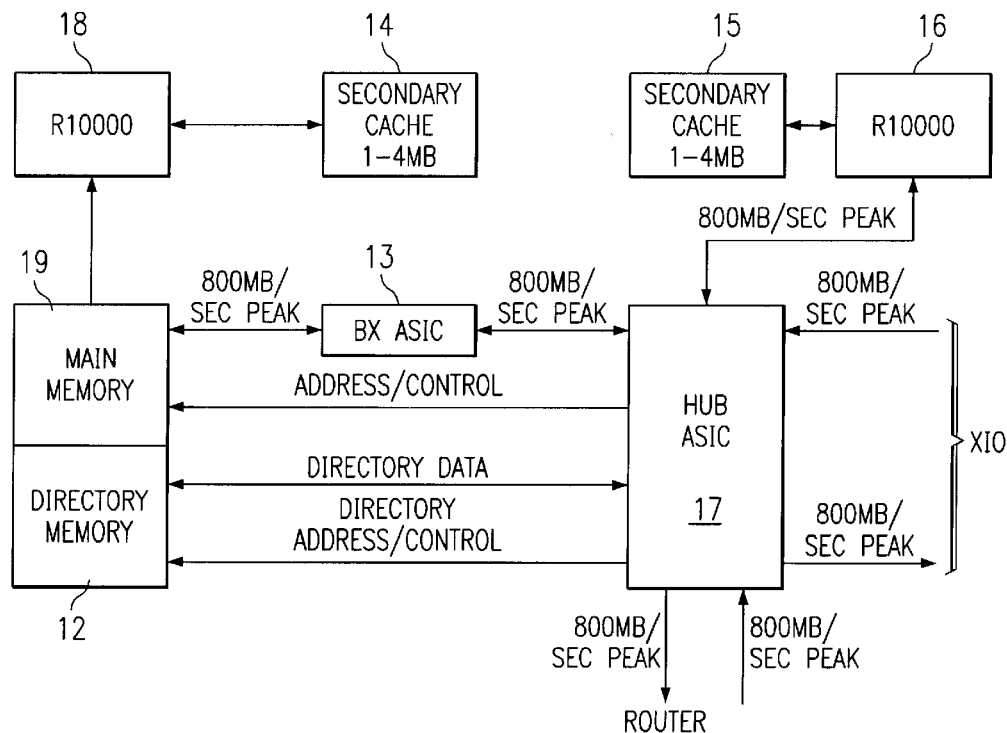
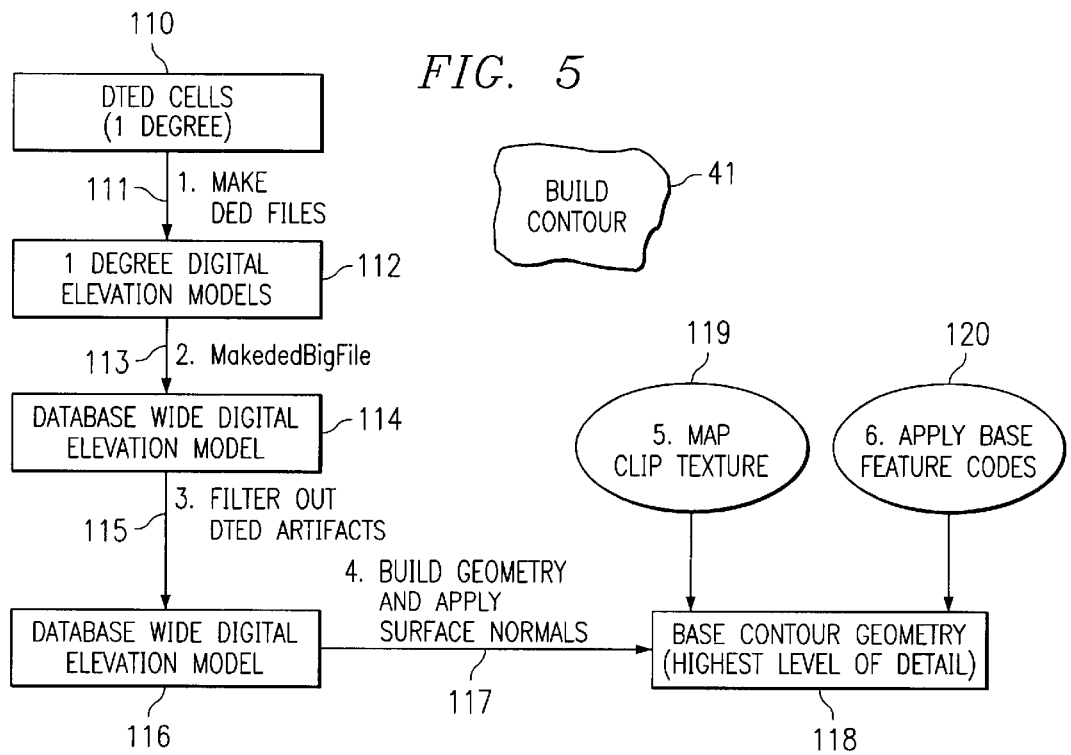

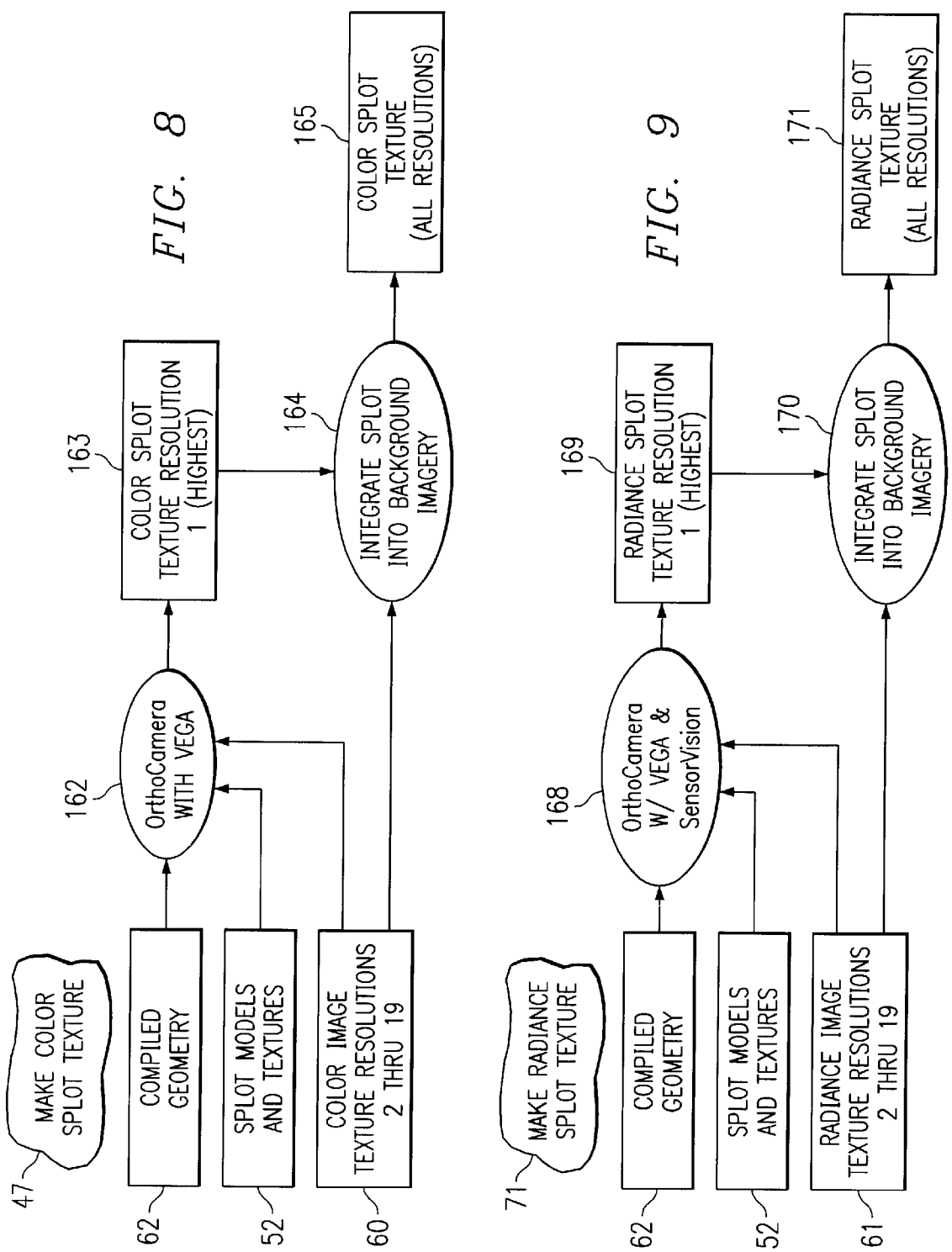

FIG. 12A

```
#!/usr/sgitcl/PSI/bin/psish
# Copyright 1997 by Paradigm Simulation, Inc. -- ALL RIGHTS RESERVED
# $Id: orthocamera.tcl,v 1.7 1998/03/21 00:05:54 mew Exp $

################################################################

# README
##################################################
##########################################################

# WHAT IS IT?

# orthocamera captures orthographic images of terrain, thus creating
# Splot, a "geospecific imagery" of the synthetic environment.

# HOW DO I RUN IT?

# usage: orthocamera [switches]

# See usage below for switch definitions.
# Some switches are mandatory; you must provide
# - an Application Definition File (ADF) filename
# - a Raster Tiled Dataset (RTD) filename
# - an observer Z value, which must prevent clipping by the near/far
planes.

# WHAT ELSE DO I NEED TO KNOW?

# orthocamera expects the ADF to:

# 1) Specify the objects & scene.
# 2) Define an observer (with attached sensor if necessary).
# 3) Define a window with the desired X visual.
# 4) Specify a channel which fills the window, with appropriate near/far
values.
# 5) Turn off lighting, fog, and any other effects which may cause
#    undesired visual artifacts in the captured imagery.
# 6) Specify LOD scale which ensures desired detail will be visible.

# At runtime:

```

FROM FIG. 12A

```
# 1) Window 0 will be sized to RTD's TileNumSamples.
# 2) Channel 0 will be set to ORTHO mode, and sized to RTD'S TileExtent.
# 3) If SV & ClipMap enabled, fix the clipmap's gstate table.
# 4) Observer 0 will be disconnected from its motion model (if any).
#    It will move across RTD's active tiles with XYZHPR = X,Y,obsz,0,-90,0.

# OTHER NOTES

# GL doesn't render to window pixels that are not visible. If orthocamera
# is iconified or another window placed on top, images can be corrupted.
# Use the "pause" button to interrupt image grabbing while shuffling windows.
# orthocamera automatically pauses if the window is iconified.
```

FIG. 13A

```
################################################################

# Procedure definitions
##################################################
########################################################## print usage clues and exit
proc usage {} {
    global argv0
    global numframes initframes texmin texmax puts {$Id: orthocamera.tcl,v 1.7 1998/03/21 00:05:54 mew Exp $}
    puts "usage: $argv0 \[switches\]"
    puts "\t-adf file.adf : ADF of scene to be splotted"
    puts "\t-rtd file.rtd : RTD of splot images to generate"
    puts "\t-obsz z : observer's Z value"
    puts "\t-numframes n : frame delay before every grab ($numframes)"
    puts "\t-initframes n : frame delay before first grab ($initframes)"
    puts "\t-texmin n : minimum clip tex level ($texmin) "
    puts "\t-texmax n : maximum clip tex level ($texmax) "
    puts "\t-sv : enable SensorVision"
```

FROM FIG. 13A

```
        puts "\t-ladbm : enable vgLADBM"
        puts "\t-clipmap : enable vgCMObject"
        puts "\t-subset tminx,tminy,tmaxx,tmaxy : subset of tiles to
iterate"
        puts "\t-nearfar near,far : override ADF's near/far clip distance"
        exit 1
}

# The Workhorse -- given a tile x/y, render and grab a Splot image.
proc grab_splot { rtd tx ty } {
        global vg_obs numframes
        global obsz obsh obsp obsr
        global grabx graby grabw grabh
        global grab_paused .gui.percent_complete config -text [format "tile %d,%d" $tx $ty]

move observer to center of current tile
        vgtcl setpos $vg_obs \
           [$rtd tilecenterx $tx $ty] \
           [$rtd tilecentery $tx $ty] \
           $obsz $obsh $obsp $obsr stay here while paused or iconified
        while { $grab_paused || ![string compare [wm state .] "iconic"] } {
           vgSyncFrame
           vgFrame
           update
        } ensure the window is on top, and draw several frames.
        for {set i 0} {$i < $numframes} {incr i} {
           vgSyncFrame
           vgFrame
           raise
           update
        }
```

FIG. 14A

```
    # save window to an image file
    pfPushState
    pfBasicState
    pfuSaveImage [$rtd tilename $tx $ty] $grabx $graby $grabw $grabh 0
    pfpopState
}

############################################################################

# Runtime
######################################################################
###################################################################### set default values for commandline arguments ------------------------
--- set numframes 5
set initframes 1
set texmin 1
set texmax 1
set sv_enabled 0
set ladbm_enabled 0
set cmobj_enabled 0 orient observer's HPR to point straight down.
set obsh   0.0
set obsp  -90.0
set obsr   0.0 scan and validate commandline arguments ------------------------
--- for {set i 0} {$i < $argc} {incr i} { set arg [lindex $argv $i]
    switch -glob -- $arg {
        "-adf"          { set adfname    [lindex $argv [incr i]] }
        "-rtd"          { set rtdname    [lindex $argv [incr i]] }
        "-obsz"         { set obsz       [lindex $argv [incr i]] }
        "-numframes"    { set numframes  [lindex $argv [incr i]] }
        "-initframes"   { set initframes [lindex $argv [incr i]] }
        "-texmin"    { set texmin     [lindex $argv [incr i]] )
        "-texmax"    { set texmax     [lindex $argv [incr i]] )
        "-subset"    { set subset     [lindex $argv [incr i]] }
```

FROM FIG. 14A

```
            "-nearfar"    { set nearfar    [lindex $argv [incr i]] }
            "-sv"         { set sv_enabled 1 }
            "-ladbm"      { set ladbm_enabled 1 }
            "-clipmap"    { set cmobj_enabled 1 }
            default {
                puts "ERROR unrecognized switch \"$arg\""
                usage
            }
        }
    } if { ![info exists adfname] } {
        puts "ERROR ADF filename (-adf) not specified"
        usage
    }
```

FIG. 15A

```
if { ! [info exists rtdname] } {
    puts "ERROR RTD filename (-rtd) not specified"
    usage
} if { ! [info exists obsz] } {
    puts "ERROR observer Z (-obsz) not specified"
    usage
} if { [info exists subset] } {
    set numvars [scan $subset "%d, %d, %d, %d" tminx tminy tmaxx tmaxy]
    if { $numvars != 4 } {
        puts "ERROR subset format must be \"tminx,tminy,tmaxx,tmaxy\""
        usage
    }
} puts "$argv0 start (\$Revision: 1.7 $)"

read the splot RTD ------------------------------------------
```

FROM FIG. 15A

```
source "/usr/local/tectonics/lib/rtd2.tcl"
rtdNew splotRTD
splotRTD read $rtdname create tcltk parent window ---------------------------
--- tk appname "orthocamera"
wm overrideredirect . 1                ;# no window management,
please
win resizable . 0 0 frame .vg -relief groove -bd 4
pack .vg -padx 5 -pady 5 -side top frame .vg.parent \
      -width [splotRTD tilenumsamplesx] \
      -height [splotRTD tilenumsamplesy]
pack .vg.parent frame .gui -relief flat
pack .gui -padx 5 -pady 5 -side bottom checkbutton .gui.grab_paused -text "Pause" -relief raised
pack .gui.grab_paused -side left
.gui.grab_paused deselect label .gui.percent_complete -width 15 -anchor e -text "loading..."
pack .gui.percent_complete -side right update

INITIALIZE VEGA ---------------------------------------
--- pftcl load
```

FIG. 16A

```
# order of init functions is significant
vgInitSys
if { $sv_enabled }     { svInitSensor }
if { $ladbm_enabled } { vgInitLADBM }
if { $cmobj_enabled } { vgInitCMObj }

# DEFINE VEGA ------------------------------------------------
--- vgDefineSys $adfname post-define ------------------------------------------------
--- get handles to vega things
set vg_win [vgGetWin 0]
set vg_obs [vgGetObserv 0]
set vg_chn [vgGetChan 0]
if { $cmobj_enabled } { set vg_cmo [vgGetCMObj 0] } override ADF's process model to single-threaded.
(cuz pfuSaveImage must be in DRAW, and vgTcl isn't MP-safe yet. )
vgProp [vgGetSys] VGSYS_MPMODE VGSYS_MPO override ADF's window definition
vgProp $vg_win VGWIN_WININPUT 0 override ADF's channel definition
vgProp $vg_chn VGCHAN_FRUSTUM VGCHAN_ORTHO
set tex [splotRTD tileextentx]
set tey [splotRTD tileextenty]
vgChanFrust $vg_chn \
    [expr -$tex / 2.0] [expr $tex / 2.0] \
    [expr -$tey / 2.0] [expr $tey / 2.0]
if {[info exists nearfar]} {
    set numvars [scan $nearfar "%d, %d" near far]
    if { $numvars != 2 } {
        puts "ERROR nearfar format must be \"near,far\""
        usage
    }
    vgChanNearFar $vg_chn $near $far
}
```

TO FIG. 16B

FIG. 16B
FROM FIG. 16A

```
# override ADF's observer definition
vgProp $vg_obs VGOBS_TETHERSTATE VGOBS_STATIC

# CONFIG VEGA ----------------------------------------
--- embed vega window in tk frame widget
vgProp [vgGetSys] VGSYS_APPINPUT VG_TRUE
vgConfigSys
vgtcl reparent .vg.parent $vg_win
vgConfigVega post-config -----------------------------------------
--- if { $cmobj_enabled } {
    vgProp $vg_cmo VGCMOBJ_MIN_TEX_LEVEL $texmin
    vgProp $vg_cmo VGCMOBJ_MAX_TEX_LEVEL $texmax
```

FIG. 17A

```
} finish substituting cliptexture into SV's indexed geostate table
if { $sv_enabled && $cmobj_enabled } {
    vgSyncFrame
    vgFrame
    _vgtcl_FixIRChanGStateTable $vg_chn $vg_cmo
} initial frame delay to allow app startup to stabilize.
for {set i 0} {$i < $initframes} {incr i} {
    update
    vgSyncFrame
    vgFrame
}
```

FROM FIG. 17A

```
# define screen area to be grabbed
set grabx 0
set graby 0
set grabw [SplotRTD tilenumsamplesx]
set grabh [splotRTD tilenumsamplesy]

# main render loop ------------------------------------
--- set numimages 0
if { [info exists subset] } { grab a subset of splot tiles
    for {set ty $tminy} {$ty <= $tmaxy} {incr ty} {
       for {set tx $tminx} {$tx <= $tmaxx} {incr tx} {
           grab_splot splotRTD $tx $ty
           incr numimages
       }
    }
} else { grab "all" tiles (as defined by statemap)
    splotRTD foreachtile tx ty {
       grab_splot $_this $tx $ty
       incr numimages
    }

} print stats and exit --------------------------------
--- puts "argv() complete.  $numimages images grabbed"

exit 0

#EOF
```

METHOD AND APPARATUS FOR BUILDING A REAL TIME GRAPHIC SCENE DATABASE HAVING INCREASED RESOLUTION AND IMPROVED RENDERING SPEED

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of computer graphics and specifically to the field of creating a database with improved performance and resolution for large areas rendered in real time. The present invention presents a method and apparatus for creating a database that enhances the resolution of a scene and renders more efficiently in real time.

BACKGROUND OF THE INVENTION

Typical graphics rendering systems utilize a geotypical texture database, wherein geotypical textures are stored in memory and utilized to fill in textures for every occurrence of a particular texture, for example a cornfield. The geotypical cornfield texture is held in memory and used repeatedly on every polygon that represents a small section of the cornfield. Typically, there are many corn field texture polygons requiring the geotypical cornfield texture to be used thousands of times in a scene containing cornfields. Thus, such a geotypical database would use a large number of polygons to represent the surface of the earth.

Real time rendering requires that each polygon undergo a mathematical transformation, a matrix multiplication within each display frame to map each polygon from world coordinates to display coordinates. Typical graphics rendering systems have limited processing power to render a large number of polygons in real time, thus the presence of the polygons slows down system performance during real time rendering. Thus, there is a need for a method and apparatus that reduces the number of polygons that must be processed in real time rendering.

Current rendering systems can display large geospecific images, however, resolution of those graphics rendering systems is limited to the resolution of the source imagery. Thus, there is a need for a method and apparatus that enables enhancement of rendered imagery beyond the resolution of the source imagery.

There is also a shortage of high-resolution imagery data coverage worldwide. In many cases only low-resolution imagery is available and in some cases no imagery is available. Thus, there is a need for a method and apparatus that enables the creation of real time scenery in areas where there is no source imagery available.

SUMMARY OF THE INVENTION

The present invention provides a method and apparatus for building a database off-line that can be used to efficiently render a scene in real time. The present invention enables creation of a database comprised of high-resolution models incorporated into lower-resolution source imagery. The present invention renders and captures an orthographic projection of a scene and stores it as a pixel representation of the rendered imagery and the models. The pixel representation is stored in a database for rendering in real time. The resulting database can be rendered more efficiently in real time than databases built using previously known techniques.

The database provides improved resolution and improved rendering performance. Scene resolution is enhanced by substituting images of high-resolution geotypical textures and models in place of lower-resolution source imagery. The present invention builds a database generated from an orthographic rendering of a enhanced scene wherein images of high-resolution models (SPLOT models) have been inserted into lower-resolution source imagery. The rendered representation of the scene is stored in a database for rendering in real time.

The present invention builds a database containing high-resolution pixel representations and lower-resolution polygonal representations, thereby enabling switching between the pixel representation for two-dimensional rendering and the polygonal representation of a feature for three dimensional rendering in a scene. The present invention generates a database that enables efficient rendering in real time.

The present invention removes excess polygons from culture to speed up the real time rendering process. A visual database generally includes polygons that represent the undulating surface of the terrain, plus additional polygons that represent cultural features on the terrain. The present invention reduces the polygons that represent cultural features by replacing them with textures derived from said polygons. For example, a database may contain polygons with a geotypical cornfield texture, said polygons coplanar with the polygons representing the terrain surface; and other polygons with a geotypical runway texture, said polygons also coplanar with the terrain surface; and other polygons that represent paint markings on said runway, coplanar with the runway polygons; and polygons used to represent three-dimensional features (for example, buildings) on the terrain. All such cultural polygons may be replaced by a single large texture applied to the terrain surface polygons, said texture derived from the polygons representing the cornfields, the runways with its surface markings, and the buildings. Said texture may be considered as pseudo-geospecific. inasmuch as it appears very similar to high-resolution imagery, were such imagery available.

The present invention provides a method and apparatus that enables construction of a database having fewer polygons to enable higher performance rendering in real time. The present invention also enables creation of synthetic high-resolution imagery where no source imagery is available. The present invention also provides an apparatus and method for enhancing the resolution of a representation of source imagery.

The present invention renders a polygonal representation of a scene (geometry and texture) containing high-resolution models, as an orthographic projection and then captures a pixel representation of an orthographic projection of the scene. The orthographic pixel textures are combined into a composite texture. The resulting composite texture is then draped over the surface contour. The composite texture can be rendered rapidly because the bulk of the cultural features have been transformed from a polygonal representation to a texture representation. The initial underlying polygons, representing the culture which slow down real time rendering, are no longer a part of the scene. The present invention also removes two-dimensional coplanar polygons. Thus, the present invention enables rendering a scene with a fraction of the polygons utilized in typical graphical rendering systems. The present invention provides essentially the same scene content with an order of magnitude reduction in the number of polygons, an increase in resolution and additional coverage in areas where source imagery is unavailable.

Resolution is effectively increased in selected target areas. For example, in a five-meter resolution source image, the present invention enables an operator to mark, locate and digitize features such as roads buildings and fields that appear in the image. For example, a road in a five-meter resolution image may be visible but not as sharp as desired. The present invention provides a method and apparatus for sharpening the presentation of the road in the image. The present invention provides a method and apparatus for creating models comprised of polygons and high-resolution textures to replace or create the features in an image, thereby increasing the overall imagery resolution.

The present invention enables replacement of original features with sharper, higher-resolution models. The same process can be used to create and add features such as parking lots, buildings and fields that may or may not appear in the source imagery. The resulting intermediate image comprises a combination of the five-meter resolution source imagery and the higher-resolution models. The combination yields an image with higher resolution than the original five-meter source imagery.

The present invention renders an orthographic projection of the scene including the models at higher resolution than the source imagery. For example, a one-meter resolution orthographic projection rendering is performed for a five-meter resolution source imagery scene containing sub-meter resolution model textures. Thus, the one-meter orthographic projection effectively under samples the sub-meter resolution model texture and over samples the five-meter texture surrounding the model. Thus, the orthographic projection provides higher resolution in the target area comprising the models and is sharper than the original image in the target area. Moreover, the higher-resolution imagery correlates well with the original imagery so that the enhanced image looks like the scene in the original image. The resulting synthetic imagery also correlates well with the high-resolution polygon scene.

The present invention enables an operator to select features in the source imagery for digitization and replacement with high-resolution models or he may chose to add high-resolution models for features that do not appear in the source imagery. The orthographic rendering is preferably performed by Vega, which is available from Paradigm Simulation, Inc., Dallas, Tex. and runs on the Onyx2 computer system shown in FIG. 1. There are a plurality of commercially available graphics rendering tools and hardware platforms that can be used to generate an orthographic projection of a scene.

Feature addition is useful when source imagery is lacking. Five-meter satellite imagery is scarce and when available may be classified. Moreover, there are gaps in coverage where no imagery is available. Satellite imagery also presents cloud coverage problems when clouds obscure portions of the imagery. Additionally, satellite imagery is often taken at different times of year so adjacent shots do not match and do not create a coherent mosaic, for example, summer in one section and snow covered in winter in another section so adjacent sections do not match. Thus, satellite imagery, even if available, is problematic. The present invention enables scene generation without any source imagery. The present invention enables generation of a scene from maps of surface contours and features without actual source imagery.

Correlation of source imagery can be problematic. Often database imagery is created from different sources. Oftentimes feature location data and source imagery does not correlate well. The present invention creates a database that generates imagery that does correlate well because it generates enhanced-resolution features by referencing source imagery pixels.

The present invention enables an operator or an artificially intelligent feature recognition process to recognize and digitize features from various sources, including topographical maps. The present invention enables input of features from such sources. For example, topographic maps may illustrate trails, which divide small areas into different types of fields. The present invention enables an operator to use commercially available tools to digitize these fields and arbitrarily assign geotypical textures to each field. The present invention enables an operator to locate and draw or digitize features such as primary, secondary and tertiary roads. High-resolution models are substituted for selected features so that primary roads are replaced with a geotypical model of a superhighway, secondary roads are replaced with a two lane highway model, and tertiary roads are replaced with a dirt road model.

The present invention enables creation of a geospecific database based on feature location data from a map of features, without using source imagery. Such a database enables generation of a real time database, which for example, can be used in a flight simulator to train a pilot to fly over and become familiar with a geographic area for which source imagery is not available. The present invention enables creation of imagery scene data that correlates well with actual source imagery. The synthesized scene database can be created without source imagery and looks realistic. A pilot trained on such a database would recognize the actual physical terrain, even though the database was created without source imagery.

Orthographic projection is well known graphic rendering technique for graphic rendering tools such as Vega. The present invention creates a composite texture database by systematically stepping over the orthographic projection of a scene and capturing a pixel representation, section by section. The present invention captures a pixel representation of each section of the orthographic image and places them altogether in one large composite texture pixel representation. The composite texture is mapped onto the polygonal terrain contour for the scene and placed in the database for real time rendering.

A preferred embodiment utilizes a Silicon Graphics, Inc. Performer-compatible clip map data structure for storing the levels of detail used in rendering an image in real time. The clip map contains all the resolution sets for an image. For example, for a twenty-five-meter resolution source image, the clip map would contain the twenty-five-meter resolution image, and reduced-resolution data sets at fifty meters, one hundred meters, two hundred meters and so on, at progressively lower resolutions. The present invention propagates the synthetic imagery throughout the lower levels of detail stored in the image clip map.

The present invention, for example, builds a one-meter resolution image in the clip map from high-resolution geotypical textures and then down samples that image to create lower-resolution images at two meters, four meters, eight meters, etc. The present invention continues generation of reduced-resolution data sets until it has generated and placed the geotypical texture in every resolution level of the clip map. The present invention replaces source imagery with enhanced-resolution imagery that includes higher-resolution models for features of interest. The enhanced feature model is propagated into every level of the clip map for the scene.

Thus, an original twenty-five-meter source imagery resolution data set contains a one-meter model of a road rather than the original road that was captured at twenty-five-meter resolution. Thus, the road now appears sharper than it did in the original source imagery. As an observer utilizing the database moves closer in on a displayed scene and approaches the enhanced feature, it appears at higher and higher resolution, and there is a smooth transition through all the resolution data sets presented in the clip map. For example, the one-hundred-meter imagery blends into the fifty-meter imagery, which blends into the twenty-five-meter imagery, because all resolution sets are derived from the highest-resolution image data.

The present invention enables replacement of a single feature or an entire scene with a high-resolution model embedded in source imagery. The present invention utilizes Multigen 11 to build geometric models that are then embedded into source imagery to sharpen, replace or create features for inclusion in a real time database. The present invention removes any polygons that are coplanar or insignificant to simplify and reduce the number of polygons used to represent the geometric model.

For example, to build a scene of the tabletop with a sheet of paper, cups, and an ice bucket, the present invention generates a pixel representation of the tabletop with all the objects on it. Individual polygons typically carry the image texture for the tabletop and each of the objects on the tabletop. The present invention renders the typical textures polygons for the objects laying on the table to create a pixel representation or picture of the tabletop texture with everything on it. The repeating geotypical table texture is replaced with a larger geospecific texture for the entire tabletop.

Viewing the table top scene at a distance, there is no three-dimensional perspective of the objects on the table top, thus the present invention does not render the objects on the table top with all the polygons required for three-dimensional presentation of the objects. The present invention renders a two-dimensional pixel representation of the tabletop that includes the objects on the tabletop. When the observer perspective closes in on a feature, the present invention switches from the two-dimensional pixel representation to a polygonal three-dimensional representation of the feature so that the rendered feature manifests three-dimensional relief.

Switching from a two-dimensional pixel representation of an object to a three-dimensional polygonal representation also helps to prevent loss of texture sharpness that occurs at close range when the relative size of the texels representing a feature become larger than a screen pixel. In order to retain sharpness in the image the present invention switches to the three-dimensional polygonal representation of the feature comprising a geotypical textured model polygonal representation of the feature. The resulting database enables creation of an image that renders efficiently in real time and correlates well with original source objects.

Prior to the present invention, the typical graphics rendering apparatus or method encountered performance bottlenecks due to excessive polygon usage in texture representations. Thus, to reduce the number of polygons needed to render an image in real time, the prior graphic rendering method and apparatus had to settle for coarser representations of features using less polygons or fewer features. Typically, prior methods forced a reduction in geometric complexity to achieve rendering speed. The reduction in polygons also reduced resolution and information content in a polygonal representation of an image. For example, a polygonal representation of a curved road using fewer polygons had less resolution and would make the road appear choppy when compared to a polygonal representation of the same road rendered using more polygons. This trade off between performance and image complexity has been diminished by the present invention. The present invention instead improves both performance and image complexity while increasing the resolution of a scene rendered using fewer polygons than the previous typical known methods.

In one aspect of the present invention a method is presented for building a database for real time rendering of a scene comprising the steps of substituting a high-resolution polygonal feature model for a feature in scene source imagery: systematically rendering said scene containing said high-resolution model:

capturing a pixel representation of said rendered scene containing said high-resolution model; and storing said pixel representation of said rendered scene containing said high-resolution model in a database for real time rendering of said scene. In another aspect of the present invention a method is presented further comprising the step of systematically rendering an orthographic projection of said scene containing high resolution models. In another aspect of the present invention a method is presented for building a database for real time rendering of a scene comprising a polygonal representation having coplanar polygons and feature identification codes for polygons comprising the steps of substituting a high-resolution polygonal feature model for a feature in scene source imagery; systematically rendering said scene containing said high-resolution model; capturing a pixel representation of said rendered scene containing said high-resolution model; and storing said pixel representation of said rendered scene containing said high-resolution model in a database for real time rendering of said scene. In another aspect of the invention a method is presented further comprising the steps of removing polygons having a particular feature code from said polygonal representation of scene to create a reduced polygon representation; and storing said reduced polygonal representation of said scene in a data base for rendering in real time. In another aspect of the present invention a method is presented comprising the steps of: removing coplanar polygons from said polygonal representation of scene to create a reduced polygon representation; and storing said reduced polygonal representation of said scene in a data base for rendering in real time. In yet another aspect of the present invention a method is presented further comprising systematically rendering an orthographic projection of said scene containing high resolution models; removing coplanar polygons from said polygonal representation of scene to create a reduced polygon representation; removing polygons having a particular feature code from said polygonal representation of scene to create a reduced polygon representation and storing said reduced polygonal representation of said scene in a data base for rendering in real time.

In another aspect of the present invention an apparatus is presented for building a database for real time rendering of a scene comprising means for substituting a high-resolution polygonal feature model for a feature in scene source imagery; means for systematically rendering said scene containing said high-resolution model; means for capturing a pixel representation of said rendered scene containing said high-resolution model: and means for storing said pixel representation of said rendered scene containing said high-resolution model in a database for real time rendering of said scene. In yet another aspect of the present invention an apparatus is presented further comprising means for systematically rendering an orthographic projection of said scene containing high resolution models. In another aspect of the present invention an apparatus is presented for building a database for real time rendering of a scene comprising a polygonal representation having coplanar polygons and feature identification codes for polygons comprising: means for substituting a high-resolution polygonal feature model for a feature in scene source imagery; means for systematically rendering said scene containing said high-resolution model; means for capturing a pixel representation of said rendered scene containing said high-resolution model; and means for storing said pixel representation of said rendered scene containing said high-resolution model in a database for real time rendering of said scene. In another aspect of the present an apparatus is presented further comprising means for removing polygons having a particular feature code from said polygonal representation of scene to create a reduced polygon representation, and means for storing said reduced polygonal representation of said scene in a data base for rendering in real time. In another aspect of the present an apparatus is presented further comprising means for removing coplanar polygons from said polygonal representation of scene to create a reduced polygon representation; and means for storing said reduced polygonal representation of said scene in a data base for rendering in real time. In another aspect of the present an apparatus is presented further comprising means for systematically rendering an orthographic projection of said scene containing high resolution models.

BRIEF DESCRIPTION OF THE DRAWINGS

FIG. 1 is a block diagram of the Onyx2 computer system comprising a hardware environment for a preferred embodiment of the present invention;

FIG. 5 is data flow diagram for the Build Contour process comprised in a preferred embodiment of the present invention.

FIG. 8 is data flow diagram for the Make Color SPLOT Texture process comprised in a preferred embodiment of the present invention.

FIG. 9 is a data flow diagram for the Make Radiance SPLOT Texture process comprised in a preferred embodiment of the present invention.

FIGS. 12–17 comprise a source code listing for process Make SPLOT Texture which captures orthographic images of terrain creating a geospecific imagery of a synthetic environment.

DETAILED DESCRIPTION OF A PREFERRED EMBODIMENT

Figure 2:
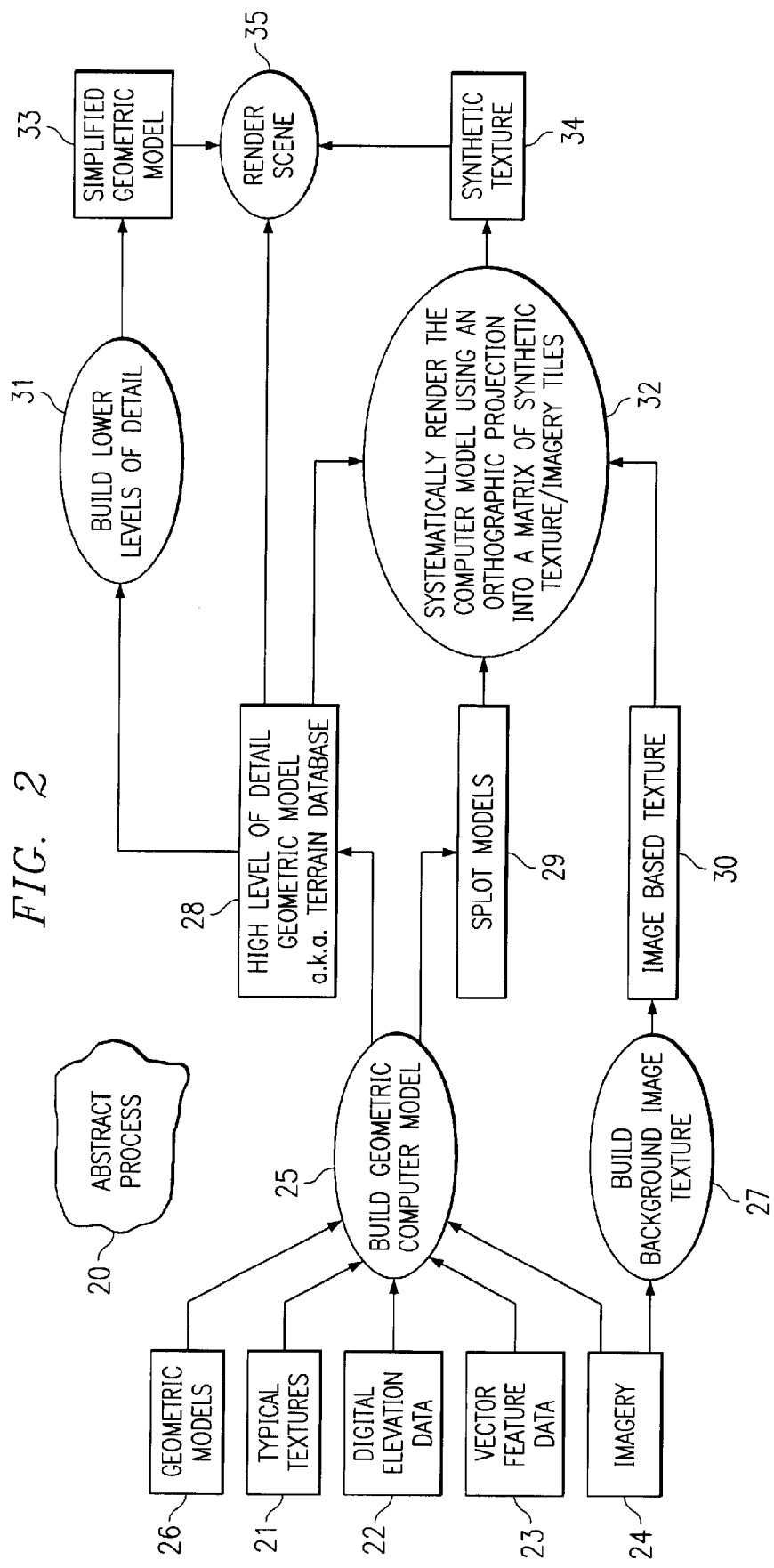
FIG. 2 is data flow diagram for a process comprising a preferred embodiment of the present invention.

The following is a detailed description of a preferred embodiment of the method and apparatus of the present invention. Turning now to FIG. 1, a preferred embodiment of the hardware rendering means for the present invention is illustrated. The present invention renders imagery off line and in real time utilizing commercially available Performer running on the Onyx2 Infinite Reality (hereinafter Onyx2) computer system, both of which are manufactured and distributed by Silicon Graphics. Inc., Mountain View, Calif.

The Onyx2 computer system comprises basic building blocks comprising, as shown in FIG. 1, processor 18, secondary cache 14, processor 16, secondary cache 15, main memory 19, directory memory 12, address controller 13 and Hub ASIC 17 that connects the processors, main memory and its associated directory memory, through a dedicated router port, and the Input/Output subsystem. The native graphics programming interface for Onyx2 is OpenGL. OpenGL is designed to be independent of operating systems and window systems, and is supported on virtually all workstations and personal computers available in the industry today. The Silicon Graphics Onyx2 hardware and associated software are described in the Onyx2 Technical Report, October 1996, published by Silicon Graphics and hereby incorporated by reference.

Turning now to FIG. 2, a process comprising a preferred embodiment of the present invention is presented. In a preferred embodiment of the present invention the means for Building a Geometric Computer Model 25 comprises Multigen If, a software apparatus available from Multigen, Inc., San Jose, Calif. Multigen If comprises software that executes in conjunction with a processor, memory, and inputs means as shown in FIG. 1. In a preferred embodiment, process Build Geometric Computer Model inputs Geometric Models 26 (three-dimensional polygonal representations of houses, trees, etc.), Geotypical Textures 21 (which are mapped onto the models), Digital Elevation Data 22 (representing contour of the terrain), Vector Feature 23 data (representing locations and types of features) and Source Imagery 24 data.

In a preferred embodiment, source imagery is processed so that selected cultural features are digitized to become vector feature data representations. The present invention replaces the vector feature data with high-resolution three-dimensional polygonal models containing geotypical textures. These polygonal models and textures are embedded within the source imagery that is imported along with the associated Digital Terrain Elevation Data 22 to the process Build Geometric Computer Model 25.

Process Build Geometric Computer Model 25 generates and outputs High Level of Detail Geometric Model ("Terrain Database") 28 data and SPLOT Models 29 data. High Level of Detail Geometric Model data 28 is passed to process Build Lower Levels of Detail 31. Process Build Lower Levels of Detail 31 simplifies High Level of Detail Geometric Model 28 by removing coplanar and insignificant polygons and outputs Simplified Geometric Model 33 data.

In a preferred embodiment the means for Building Lower Levels of Detail 31 and means for Simplifying the Geometric Model 33 comprise the hardware and software apparatus shown in FIG. 1 implementing the steps comprising process Build Lower Levels of Detail 31. Process Build Background Image Texture 27 inputs Imagery 24 data products, joins them together forming a mosaic, and reformats the imagery for rendering. Process Build Background Image Texture 27 generates and outputs Image Based Texture 30 data.

The High Level of Detail Geometric Model 28 data, SPLOT Models 29 data and Image Based Texture 30 are input to the process Systematically Render Computer Model 32 that renders a computer model comprised of SPLOT Models 29 data, High Level of Detail Geometric Models 28 data and Image-Based Texture 30 data. Process Systematically Render the Computer Model 32 renders a computer model utilizing an orthographic projection into a matrix of synthetic texture and imagery tiles.

In a preferred embodiment, means for Systematically Rendering the Computer Model using an orthographic projection into a matrix of synthetic texture/imagery tiles 32 comprises process Make Color SPLOT Texture 47, Make Radiance SPLOT Texture 71, and process Ortho Camera 39, implemented on an Onyx2 computer system, as shown in FIG. 1. Thus the present invention utilizes imagery and geometric models and produces Synthetic Texture 34 data. Process Render Scene 35 receives inputs Simplified Geometric Model 33 data. High Level of Detail Geometric Model 28 data and Synthetic Texture 34 data. In a preferred embodiment, the means for performing Render Scene 35 comprises the commercially available Vega, manufactured and distributed by Paradigm Simulation, Inc., Dallas, Tex.

Vega comprises a software environment that runs on top of Performer on the Onyx2 computer system shown in FIG. 1. There are a number of tools available to render a scene using the database comprising Simplified Geometric Model 33 data, High Level of Detail Geometric Model 28 data and Synthetic Texture 34 data as generated by the present invention. The present invention provides a method and apparatus for building a simplified geometric model that resembles a two-dimensional version of the highest level of detail of the integrated source models, elevation, features and imagery.

Figure 3A:
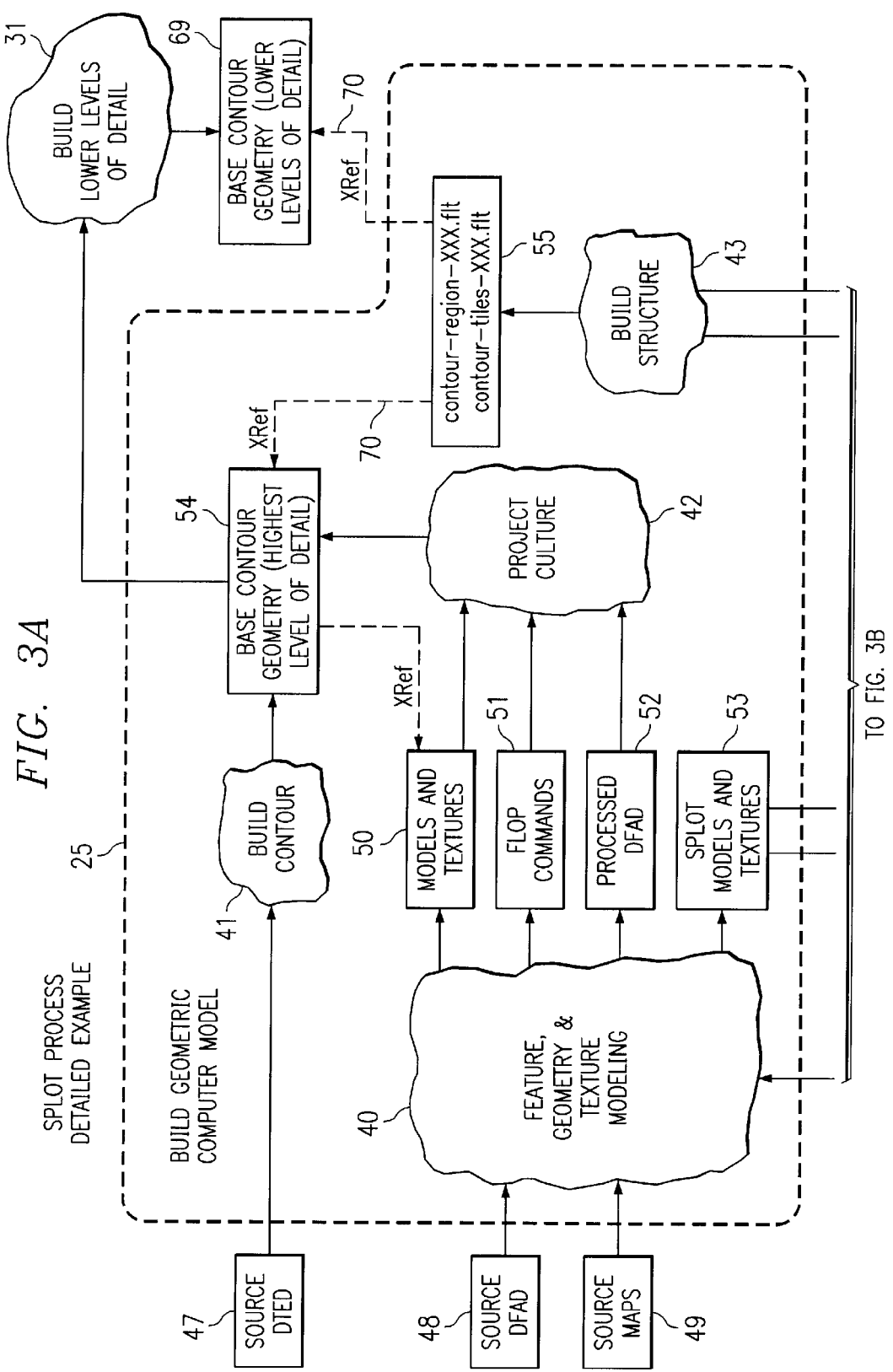
FIGS. 3A and 3B are data flow diagram for an overview of a set of processes comprising a preferred embodiment of the present invention.
Figure 3B:
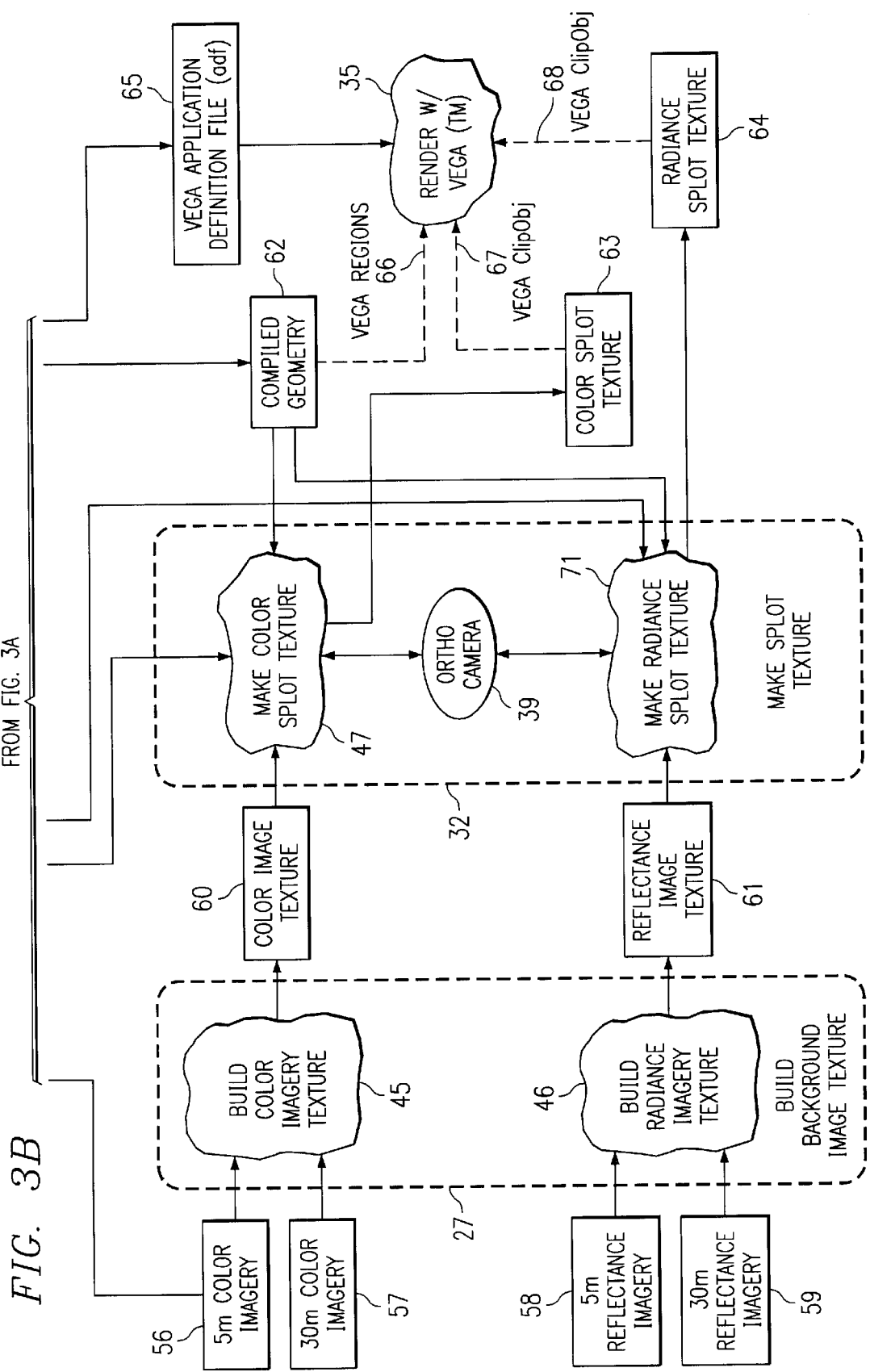

Turning now to FIGS. 3A and 3B, the process shown in FIG. 2 is broken down into more specific processes providing a detailed specific example of the present invention. The components of the process shown in FIG. 2 map onto FIG. 3 processes. Process component Build Geometric Computer Model 25, which builds a high level of detail model, is broken down into four processes as shown in FIG. 3. Process Feature Geometry and Texture Modeling 40 receives inputs source DFAD (digital feature analysis data) 48, Source Maps 49 data and five-meter Color Imagery 56 data. DFAD comprises digital vector data, wherein features are described in terms of lines, points and polygons, for example, a line representing a road. The Feature Geometry and Texture Modeling process 40 uses the Source DFAD 48 data and Source Maps 49 data to generate Models and Textures 50 data, FLOP commands 51, processed DFAD 52 and SPLOT Models and Textures 53 data. The FLOP commands 52, Models and Textures 50 and processed DFAD are output by process Feature Geometry and Texture Modeling 40.

Process Project Culture 42 inputs the FLOP commands 51 vector data (which describes the locations of features, including roads, lakes, buildings, etc.) and converts the vector data into three-dimensional geometry, a process well known in the art. The processed DFAD 52 data is used by the Project Culture 42 process, implemented in a preferred embodiment by the Multigen 11 tool. Models and Textures 50 data are the instances of features that are projected. For example, a FLOP command describes models and locations of models, which enables the Project Culture 42 process to add models to the database at specified locations.

Process Build Contour 41 inputs source Digital Terrain Elevation Data (DTED) 47 and builds Base Contour Geometry 54. Base Contour Geometry 54, in a complex database is divided into a plurality of sections and levels of detail regarding the terrain surface. The Feature Geometry and Texture Modeling process outputs are added to the highest level of detail for the image.

Figure 11:
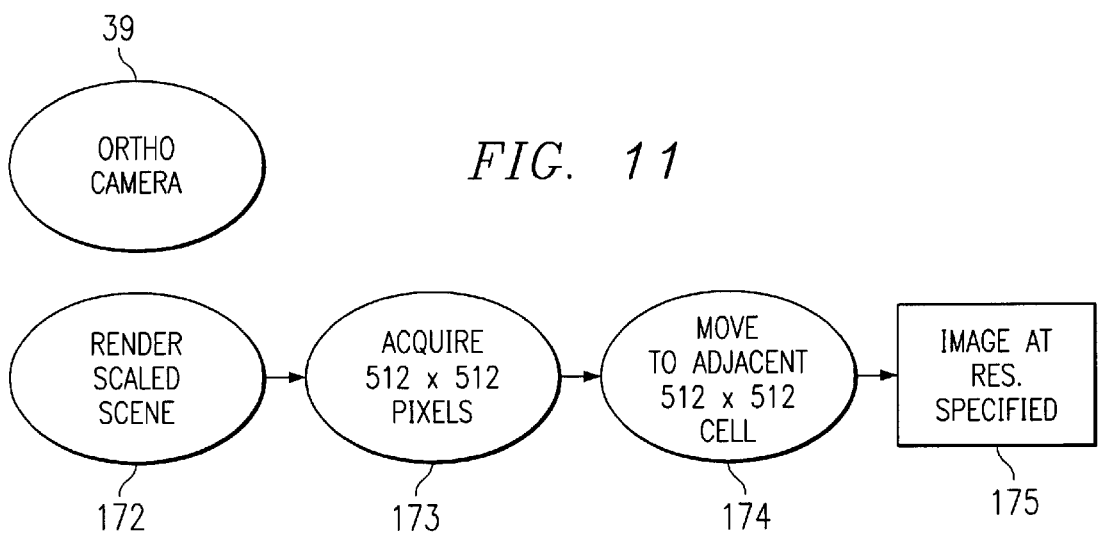
FIG. 11 is a data flow diagram for the Ortho Camera process comprised in a preferred embodiment of the present invention.

Process Build Lower Levels of Detail 31 removes coplanar and insignificant polygons from the highest level of detail to produce lower levels of detail. Thus, process Build Lower Levels of Detail 31 maps onto Build Geometric Computer Model 25 and Build lower Levels of Detail 31 of the process shown in FIG. 2. A preferred means for comprises process Building Lower Levels of Detail implemented on the Onyx2 computer system shown in FIG. 1. Process Build Lower Level of Detail is illustrated in FIG. 11.

Process Build Structure 43 is another process comprised in Build Geometric Computer Model 25. The Build Structure 43 process divides a scene geometry or contour database into a grid. Sections of the grid form aggregations referred to as contour tiles and contour regions. These aggregations make the contour data easier to manage by a rendering system. Contour tiles represent a plurality of geometry polygon files in the database. Contour regions reference a plurality of contour tiles. For example, there may be approximately three hundred contour regions referenced that represent and bind together approximately ten thousand underlying polygon files in a database.

Vega utilizes the contour regions to render a scene. Process Build Structure 43 generates Compiled Geometry 62 or contour regions that have been reformatted for rapid loading and rendering by process Render with Vega 35. Process Build Structure 43 also generates a Vega Application Definition File (ADF) 65 that contains information to direct process Render with Vega 35 regarding which database portions to load for rendering.

Process Render with Vega 35 inputs Vega Regions 66 and Vega Clip Objects 67 and 68. The clip objects associate database portions or files in the database with a particular image. The ADF file defines the regions and clip objects. Vega associates files in the database with an image. The clip objects indicate which files use particular source imagery or SPLOT imagery. Thus Vega utilizes the Vega regions and Vega Clip objects to render an image in real-time.

Process Build Background Image Texture 27 comprises process Build Color Imagery Texture 45 and Build Radiance Imagery Texture 46. Process Build Color Imagery Texture 45, for example, may receive high- and low-resolution imagery inputs of five-meter Color Imagery 56 and forty-meter Color Imagery 57. Process Build Color Imagery Texture 45 integrates the five-meter Color Imagery 56 data and forty-meter Color Imagery 57 data, builds a Clip stack and outputs Color Image Texture 60 data. The Color Image Texture 60 data comprises an aggregation of five-meter Color Imagery 56 and forty-meter Color Imagery 57. Color Image Texture 60 data output comprises a composite image made up of five-meter and forty-meter imagery data.

In a preferred embodiment of the present invention, five-meter and thirty-meter image data are provided from satellite imagery. Satellite imagery transforms the physical earth into film or an electronic representation. The present invention transforms the film or electronic representation of the physical earth into a real time database and renders the representation in real time. In a preferred embodiment of the present invention the thirty-meter data is used to fill in gaps that may occur in the five-meter imagery data coverage, since thirty-meter resolution imagery data is available in a much broader geographic area than five-meter imagery data.

In a preferred embodiment of the present invention, process Build Color Imagery Texture 45 builds a clip stack. A clip stack is a multi-resolution data structure comprising the resolution sets necessary for rendering an image. The clip stack is a data structure compatible with the Onyx2 computer system shown in FIG. 1. The clip stack contains a copy of imagery data at low resolution, and a copy at successively higher resolutions. In a preferred embodiment, high-resolution and low-resolution imagery, for example, the present invention builds nineteen resolution levels for an image, for example, input source imagery may be input at five-meter and forty-meter resolution. In a preferred embodiment, for example, the forty-meter imagery data is stored in resolution level five and the five-meter imagery data is stored in resolution level two. The present invention produces resolution level one, which is higher resolution than the original source imagery data.

A similar processing path is utilized to create resolution sets for reflectance or radiance data. Build Reflectance Imagery Texture 46 inputs five-meter Reflectance Imagery 58 data and thirty-meter Reflectance Imagery 59 data to produce Reflectance Image Texture 61 data comprising the resolution sets for Reflectance or infrared data.

Process Systematically render the computer model using an orthographic projection into a matrix of synthetic texture and imagery tiles, which is labeled in FIG. 3 as Make SPLOT Texture 32 comprises processes Ortho Camera 39, Make Color SPLOT Texture 47 and process Make Radiance SPLOT Texture 71. Process Make Color SPLOT Texture 47 inputs Color Image Texture 60 data, Compiled Geometry 62 data (contour region files) and SPLOT Models and Textures 53 (alternate feature representations, for example, shadows in place of trees, higher-resolution detailed models in place of simple models used in real time rendering).

Process Make SPLOT Texture 32 inputs SPLOT Models and Textures, combines these models and textures as alternative representations of features with source imagery data and passes all inputs to Process Ortho Camera 39 for rendering as an image. Process Make SPLOT Texture 32 processes the rendered image, generates and outputs the Color SPLOT texture 63 data. The Color SPLOT Texture 63 data is in the same format as Color Image Texture data, but additionally includes higher-resolution SPLOT models. The Color SPLOT Texture 63 data is a pixel representation or image of an orthographic projection or rendering of the polygonal scene which may include source imagery, feature polygons, and high-resolution SPLOT models. FIGS. 12–17 comprise a source code listing for process Make SPLOT Texture 32 which captures orthographic images of terrain creating a geospecific imagery of a synthetic environment.

Process Render with Vega 35 inputs Vega Clip Objects 67 from Color SPLOT Texture 63 and Vega Clip Object 68 data from Radiance SPLOT Texture 64 and Vega Regions 66 from Compiled Geometry 62 data. Process Render with Vega 35 utilizes these inputs to render the scene that has now been processed to add in the higher-resolution SPLOT texture. The present invention substitutes simplified polygonal models are for real time rendering.

Figure 4:
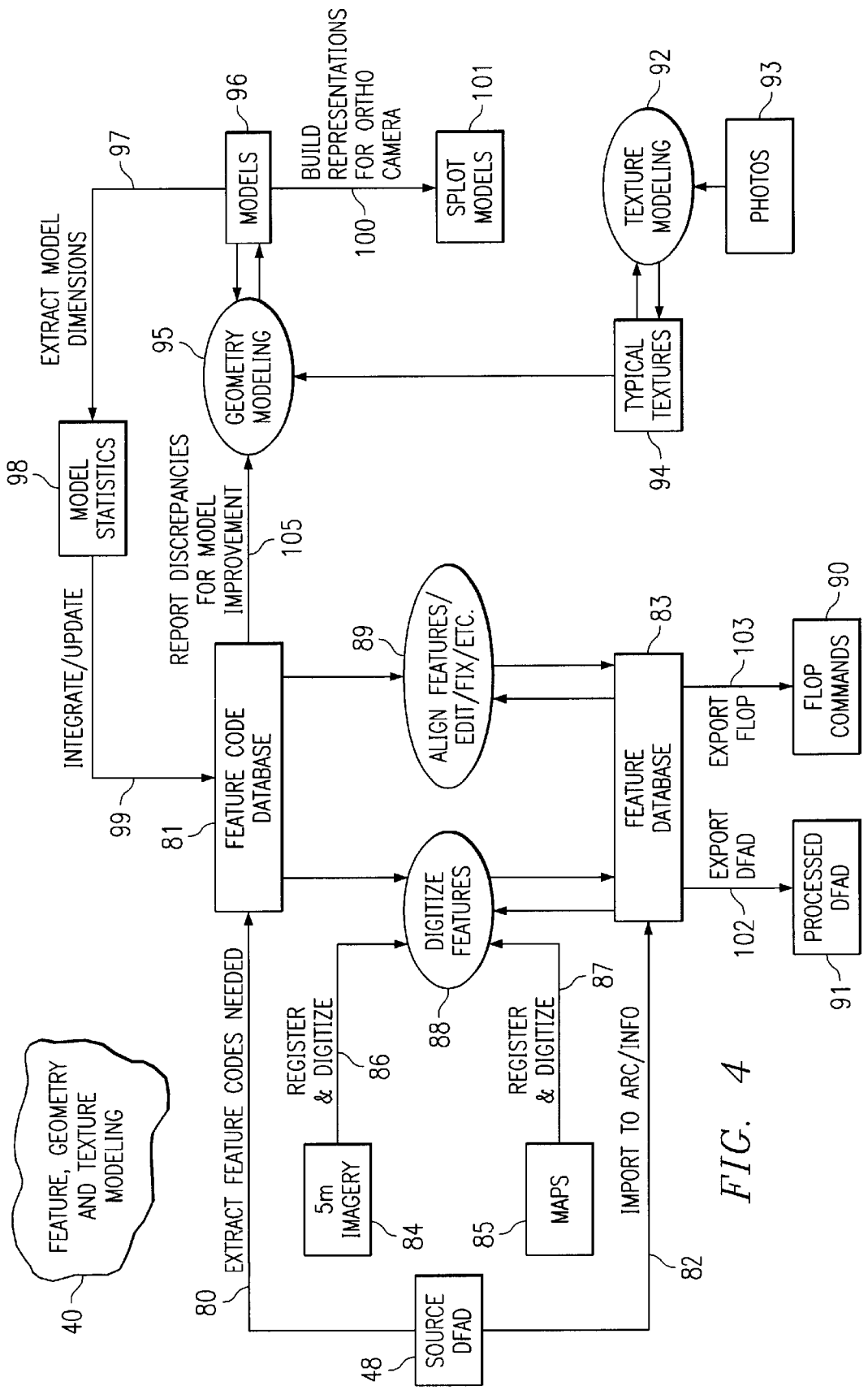
FIG. 4 is data flow diagram for the Feature, Geometry and Texture Modeling process comprised in a preferred embodiment of the present invention.

Turning now to FIG. 4, process Feature, Geometry and Texture Modeling 40 takes in source DFAD 48 and Extracts Feature Codes 80 and builds a Feature Code Database 81. DFAD comprises linear features (for example, roads), arial features (for example, lakes), and point features (for example, buildings). The Feature Code Database is a list of feature codes and descriptive information regarding the feature data. The process determines the contents of the data, for example, whether or not it contains roads, trees, buildings, etc. Data content is determined by extracting and examining the feature codes. The source DFAD 48 is also imported to Arc/Info 82 and placed into the Feature Database 83. Culture can be removed based on feature code.

The present invention enables five-meter Imagery 84 Registration and Digitization 86. The present invention also enables Maps 85 Registration and Digitization 87. Vector feature data from the Feature Database 83 is displayed on a display screen along with satellite imagery for comparison and alignment. Road vectors, for example are aligned to correlate or align with the actual roads they represent in source imagery. Also, as provided by the present invention, features that are visible in the five-meter Imagery 84 or Maps 85 but are not present in DFAD are added by drawing in and digitizing features, creating vector data out of imagery and map data by drawing features digitally. Adding features enables enhanced population of the feature database.

Process Align Features/Edit/Fix 89 edits, corrects and registers the Feature Database 83 with source imagery, after which, vector data representing features better correlates with the feature locations in the imagery. DFAD is exported 102 to Processed DFAD 91 and FLOP Commands are exported 103 to Flop Commands 90. Process Texture Modeling 92 inputs Photographs 93 or pictures of models and edits them to generate Typical Textures 94. Typical Textures 94 are output to Process Geometry Modeling 95. In a preferred embodiment, a polygon editor Multigen If is provided to generate geometric Models 96 comprising polygons and textures.

Model dimensions 97 are extracted and placed in Model Statistics 98. Model Statistics 98 are used to Integrate and Update 99 the Feature Code Database 81 that is used to align features properly. For example, if a house model is located next to a road, the house model may be too big, so that the house model would overlap the road. Thus, a discrepancy report 105 for model improvement is created and sent to process Geometry Modeling to correct the misalignment by using a smaller house model that does not overlap the road. This process ensures that features do not overlap on the final scene database.

Turning now to FIG. 5, Process Build Contour 41 inputs DTED Cells 110 (cells comprise one degree of latitude and one degree of longitude, an approximately sixty miles square surface area on the earth's surface) that are reformatted to Make DED files 111 for compatibility with Multigen 11 and stored in one degree Digital Elevation Models 112. The DED files use Make Ded Big File 113 to merge all DED files into Database Wide Digital Elevation Model 114. DTED artifacts, which occur when joining adjacent DTED cells, are filtered out 115 and placed in the Database Wide Digital Elevation Model 116. Commercial Tools such as Multigen 11 are means provided by the present invention to Build Geometry (sample elevation data and build geometry polygons) and Apply Surface Normals 117 (taking the angle information out of the elevation data using the angle attribute of the geometry).

Map Clip Texture 119 associates or maps texture onto contour for every vertex in the terrain, with or without data present in the terrain or texture image. Every polygon vertex in the terrain receives a texture coordinate. Process Apply Feature Codes 120 places feature codes on the terrain resulting in the Base Contour Geometry (highest Level of Detail) 118. Base Contour Geometry 118 comprises a contour made from digital elevation data with geospecific textures mapped onto it, even though the textures may not yet exist, their geographic coverage is known.

Figure 6:
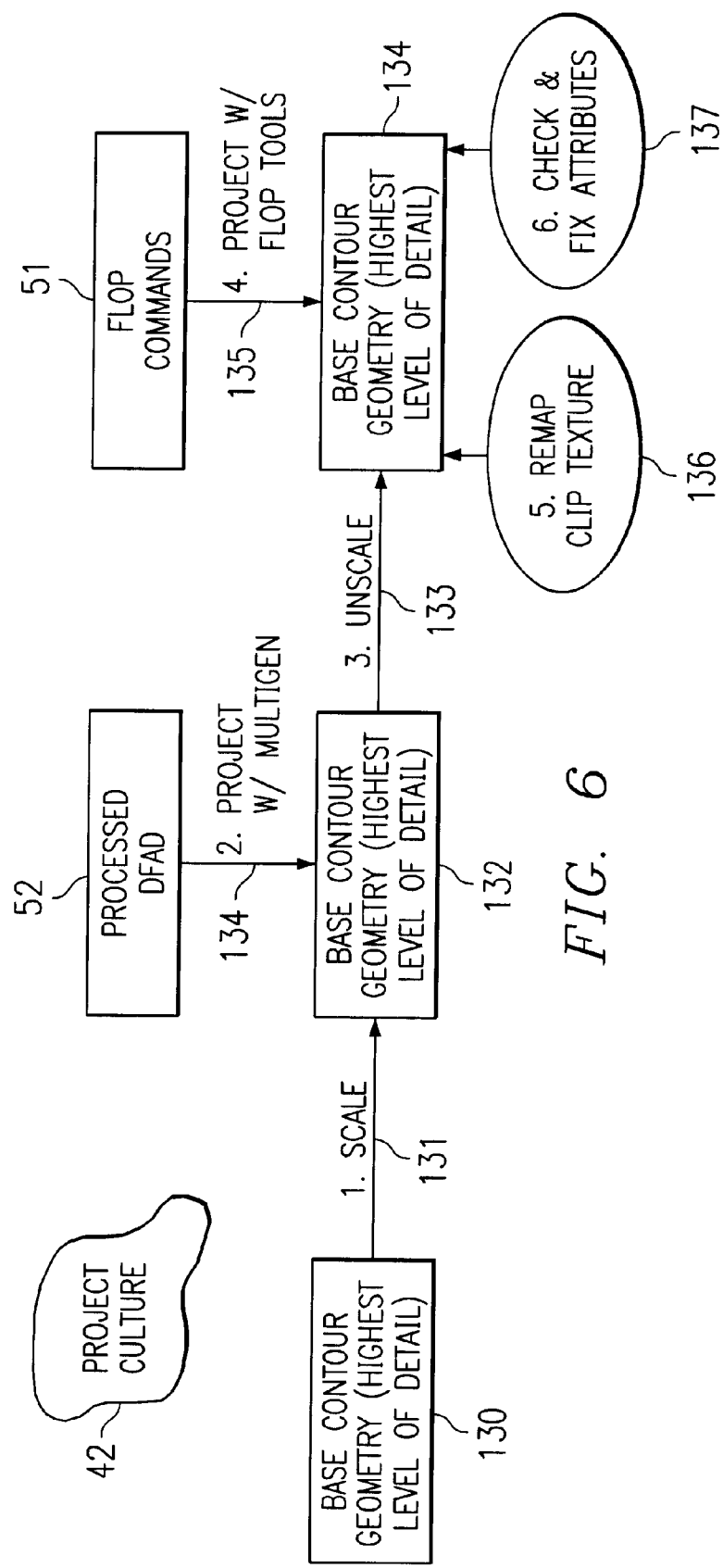
FIG. 6 is data flow diagram for the Project Culture process comprised in a preferred embodiment of the present invention.

Turning now to FIG. 6, now that the contour is built, process Project Culture 42 inputs the highest level of detail of the contour. Base Contour Geometry (highest level of detail) 130 and scales the Base Contour Geometry 130 to provide a higher-resolution solution for DFAD projection. Process Project Culture then projects Processed DFAD 52 data using Multigen 11 onto the scaled highest level of detail contour. Base Contour Geometry 132. The data is then unscaled to form the highest level of detail with Projected Culture 134. Flop Commands 51 are used to project additional culture 135 to generate Base Contour Geometry 134 (highest level of detail) as the contour highest level of detail with additional culture. Process Reap Clip Texture 136 applies photo image texture to the additional photo culture by remapping the clip texture so that it receives texture coordinates relative to the geospecific image rather than typical textures.

Process Check and Fix attributes 137 performs quality control functions on the data, corrects texture paths, corrects data artifacts, and ensures that all polygons have a feature identification code. The end product is the highest level of detail contour with additional projected culture. Process Build lower Levels of Detail 31, shown in FIG. 3 creates lower levels 141 of detail by stripping off the two-dimensional culture polygons and texture polygons from the contour highest level of detail, Base Contour Geometry 134.

Figure 7:
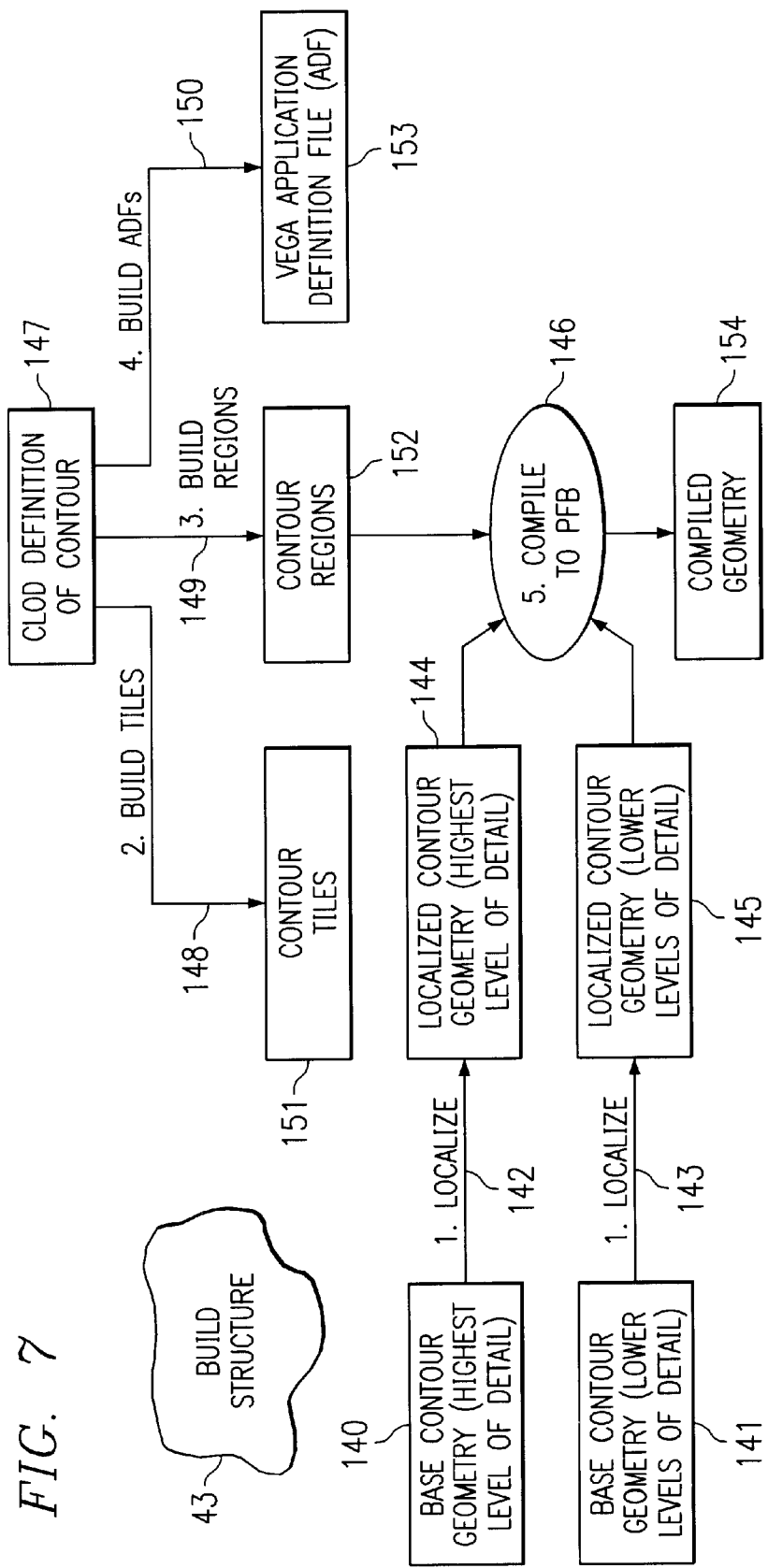
FIG. 7 is data flow diagram for the Build Structure process comprised in a preferred embodiment of the present invention.

Turning now to FIG. 7, process Build Structure 43 inputs Base Contour Geometry (highest level of Detail) 140 localizes 142 the data so that the coordinates for each tile are local to the center of the tile, instead of all tile coordinates being relative to one common origin and stores the localized data in Localized Contour Geometry 144 (highest level of detail). Process Build Structure 43 inputs Base Contour Geometry (Lower Levels of Detail) 141 localizes 143 Base Contour Geometry 141 and stores the localized data in Localized Contour Geometry (Lower Levels of Detail) 145.

Process Build Structure 43 inputs Clod definition of Contour 147 data, which is the definition of the organization of all the contour regions, tiles, and geometry files, builds 148 contour tiles 151, builds 149 Contour Regions 152 and builds 150 Vega Application Definition Files 153. Process Compile PFB 146 optimizes the regions for processing and outputs Compiled Geometry 154. Vega accepts the Compiled Geometry 154 product for rendering. Vega Application Definition File (ADF) 153 is the definition of regions as part of the database used in rendering the image in real time. The Application Definition File (ADF) informs Vega as to which regions to use when rendering. As shown in FIG. 3. Process Render with Vega 35 uses the Vega ADF 65 and Vega regions 66, which are the contour regions PFB or Compiled Geometry 154. The ADF specifies Vega regions data.

Vega Clip Objects 67 and 68 define large textures generated by process Make SPLOT Texture 47 and Make Radiance SPLOT Texture 32, respectively. Previously the large texture has been mapped onto the geometry, however, mapping occurred before the texture was defined. Thus, in rendering, Vega uses the previous mapping to combine the texture (Vega clip objects) with the geometry of the scene. Because the imagery and geometry are joined together late in the processing path, the present invention enables selection of which image to place on the geometry as specified in the ADF file. Thus, the ADF may specify mapping a color image, infrared image or no image onto the geometry.

Figure 10:
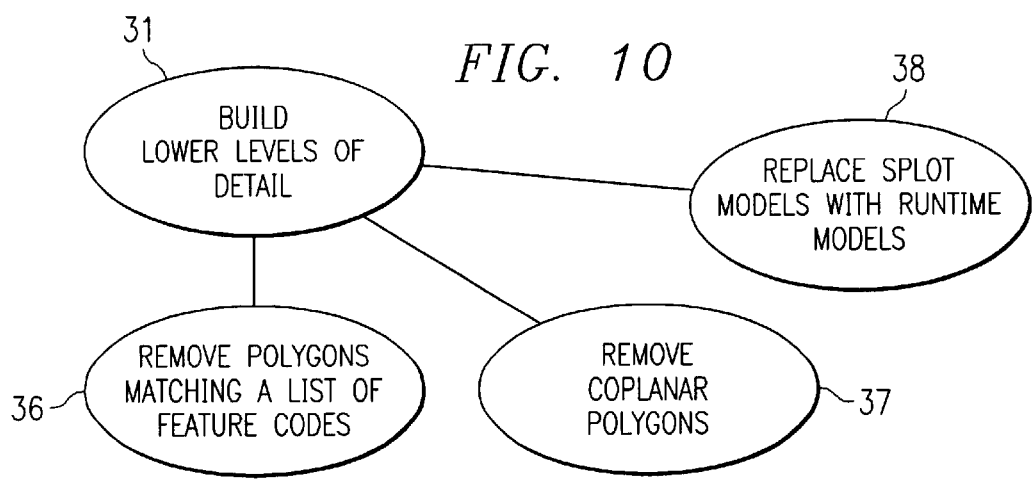
FIG. 10 is a data flow diagram for the Build Lower Levels of Detail process comprised in a preferred embodiment of the present invention.

Turning now to FIGS. 10 and 11, process Make Color SPLOT Texture 47 and process Make Radiance SPLOT Texture 71 illustrate the present invention generating composite textures and higher-resolution imagery. As shown in FIG. 8, process Make Color SPLOT Texture 47 inputs Compiled Geometry 62 comprising Contour Region PFB or imagery contour, Color Image Texture 60 Resolutions two through nineteen (comprising formatted source imagery) and SPLOT Models and Textures 52 comprising high-resolution polygonal feature models and textures into process Ortho Camera with Vega 162. The present invention renders an orthographic projection comprising the Color Imagery Texture 161, SPLOT Models and Textures 52 and Compiled Geometry 62 together into a pixel representation comprising Color SPLOT Texture Resolution One (highest resolution) 163.

Process Integrate SPLOT into background imagery 164, inputs Color SPLOT Texture Resolution One 163 and Color Image Texture Resolutions 2 through 19 and integrates them to generate Color SPLOT Texture (all resolutions) 165, a texture image of the rendered scene for resolution levels one through nineteen, The source code for Make Color SPLOT Texture is included in the software appendix.

Turning now to FIG. 9, a similar process is performed by process Make Reflectance SPLOT Texture 71. As shown in FIG. 9, process Make Reflectance SPLOT Texture inputs Compiled Geometry 62 comprising Contour Region PFB or imagery contour, Reflectance Image Texture 61 resolutions two through nineteen comprising formatted source radiance imagery and SPLOT Models and Textures 52 comprising high-resolution polygonal feature models and textures into process Ortho Camera with Vega 168. The present invention renders an orthographic projection comprising the Reflectance Imagery Texture 61, SPLOT Models and Textures 52 and Compiled Geometry 62 together into a pixel representation comprising Reflectance SPLOT Texture Resolution One (highest resolution) 169. The present invention utilizes geometry and imagery resolution levels two though nineteen and produces a higher-resolution image, resolution level one.

Process Integrate SPLOT into background imagery 170, inputs Reflectance SPLOT Texture olution one 169 and Reflectance Image Texture Resolutions two through nineteen and integrates them generate Reflectance SPLOT Texture (all resolutions) 171, a texture image containing SPLO models resolution levels one through nineteen.

Turning now to FIG. 10, process Build Lower Levels of Detail 31 comprises Remove Polygons Matching A List Of Feature Codes 36, Remove Coplanar Polygons 37 and Replace SPLOT models with Runtime Models 38. In a preferred embodiment, all features and culture have a feature identification code. Process Remove Polygons Matching a List of Feature Codes 36 removes polygons based on feature dentification code. For example, all instances of a corn field feature, for example, can be removed.

Process Remove Coplanar Polygons 37 removes redundant contour polygons. The present invention preferably builds a database such that polygons can be identified as coplanar and can later be removed. Coplanar polygons or sub-face polygons, which are subordinate to another face or polygon, do not contribute to the contour and thus are removed from the model after rendering and imaging the model. The present invention preferably builds a scene as sub-face polygons, renders and images it using Ortho Camera and removes the sub-face polygons to create a reduced polygon representation. The source code process Remove Coplanar Polygons 37, Remove Polygons Matching a List of Feature Codes 36 is included in the software appendix.

Process Replace SPLOT Models with Runtime Models places a simplified reduced polygonal model to replace the high polygon usage detailed SPLOT mode utilized to render an orthographic projection. An alternative means for Building Lower Levels of Detail 31 comprises the process implemented on a Multigen 11, available from Multigen, Inc., San Jose, Calif.

Turning now to figure 11, process Ortho Camera process Render Scaled Scene 172 uses Vega to render a scene scaled to a specified resolution per pixel. A scene can be scaled so that a 512×512 meter area of coverage is displayed within a 512×512 pixels area, thereby generating resolution of one meter per pixel. Ortho Camera renders and captures 512×512 pixels at a time. Process Acquire 512×512 Pixels 173 acquires and stores the 512×512 pixel scaled image. Process Move to Adjacent 512×512 then moves to an adjacent 512×512 pixel area. This acquisition process is repeated until it acquires the entire scene, resulting in Image at Resolution Specified 175 data that is used by Process Make Color SPLOT Texture 47 and Make Radiance SPLOT Texture 71. The source code for process Ortho Camera is included in the software appendix.

The foregoing example is but one of many implementations of the present invention. The present invention is not limited by the foregoing example, but instead limited by the following claims and their equivalents.

What is claimed is:

1. A method for building a database for real time rendering of a scene comprising
   (a) substituting a high-resolution polygonal feature model generated from vector feature data as a feature into three-dimensional scene source imagery in place of a lower resolution polygonal representation of the feature;
   (b) systematically rendering a two-dimensional representation of the three-dimensional scene source imagery of step (a) containing the high-resolution model,
   (c) capturing a two-dimensional pixel representation of said rendered scene of step (b)containing said high-resolution model;
   (d) removing the inserted high resolution model from the scene source imagery and substituting the lower resolution polygonal representation of the feature into the source imagery; and
   (e) storing said two-dimensional pixel representation of said rendered scene containing said high-resolution model in a database for real time rendering of said scene, wherein the two-dimensional representation of the scene is rendered on a display viewed from a first observer perspective and the three-dimensional representation of the scene is rendered on the display containing the lower resolution polygonal feature when the scene is viewed from a second observer perspective closer than the first observer perspective.

2. The method of claim 1 wherein step (b) comprises systematically rendering lower resolution data sets of an orthographic projection of said scene containing high resolution models.

3. A method for building a database for real time rendering of a scene comprising a polygonal representation having coplanar polygons and feature identification codes for polygons comprising:
   (a) substituting at least one high-resolution polygonal feature model generated from vector feature data as a feature into three-dimensional scene source imagery in place of a lower resolution polygonal the feature;
   (b) systematically rendering a two-dimensional representation of the three-dimensional scene source imagery of step (a) containing the high-resolution model;
   (c) capturing a two-dimensional pixel representation of the rendered scene of step (b) containing said high-resolution model;
   (d) removing the high resolution feature model inserted into the scene source imagery and substituting the lower resolution polygonal feature into the source imagery; and
   (e) and storing said two-dimensional pixel representation of said rendered scene containing said high-resolution feature model in a database for real time rendering of said scene wherein the two-dimensional representation of the scene is rendered on a display viewed from a first observer perspective; and the three-dimensional representation of the scene source imagery containing the lower resolution polygonal feature is rendered on the display when the scene is viewed from a second observer perspective closer than the first observer perspective.

4. The method of claim 3 further comprising the steps for:
   (e) removing all inserted feature model polygons having a particular feature code from said polygonal representation of scene to create a reduced polygon representation; and
   (f) storing as lower resolution data sets said reduced polygonal representation of said scene in a data base for rendering in real time.

5. The method of claim 3 further comprising the steps for:
   (e) removing inserted polygons from said polygonal representation of scene to create a reduced polygon representation; and
   (f) storing said reduced polygonal representation of said scene in a data base for rendering in real time.

6. The method of claim 3 wherein step (b) comprises systematically rendering an orthographic projection of said scene containing high resolution models.

7. The method of claim 6 further comprising the step of:
   (e) removing inserted polygons from said polygonal representation of scene to create a reduced polygon representation.

8. The method of claim 7 further comprising the step for:
   (f) storing said reduced polygonal representation of said scene in a data base for rendering in real time.

9. The method of claim 6 further comprising the step for:
   (e) removing inserted polygons having a particular feature code from said polygonal representation of scene to create a reduced polygon representation.

10. The method of claim 8 further comprising the step for:
    (f) storing said lower polygonal representation of said scene in a data base for rendering in real time.

11. A apparatus for building a database for real time rendering of a scene comprising:
    (a) means for substituting a high-resolution polygonal feature model generated from vector data as a feature into three-dimensional scene source imagery in place of a lower resolution polygonal representation of the feature;

(b) means for systematically rendering a two-dimensional representation of the three-dimensional scene source imagery of step (a) containing the high-resolution model;

(c) means for capturing a two-dimensional pixel representation of the rendered scene of step (b) containing the high-resolution model;

(d) means for removing the high resolution model inserted into the scene source imagery;

(e) means for storing the two-dimensional pixel representation of said rendered scene containing said high-resolution model in a database for real time rendering of said scene;

(f) means for rendering the two-dimensional representation of the scene on a display viewed from a first observer perspective; and (f) means for rendering the three-dimensional representation of the scene on the display containing the lower resolution polygonal feature when the scene is viewed from a second observer perspective closer than the first observer perspective.

12. The apparatus of claim 11 wherein means (b) further comprises means for systematically rendering an orthographic projection of lower resolution data sets of said scene containing high resolution models.

13. An apparatus for building a database for real time rendering of a scene comprising a polygonal representation having coplanar polygons and feature identification codes for polygons comprising:

(a) means for substituting a high-resolution polygonal feature model generated from vector data as a feature into scene source imagery in place of a lower resolution polygonal representation of the feature;

(b) means for systematically rendering a two-dimensional representation of the three-dimensional scene source imagery of step (a) containing said high-resolution model;

(c) means for capturing a two-dimensional pixel representation of the rendered scene containing said high-resolution model;

(d) means for removing the inserted feature model inserted into the scene and substituting the lower resolution polygonal representation of the feature into the source imagery; and (e) means for storing said two-dimensional pixel representation of said rendered scene containing said high-resolution model in a database for real time rendering of said scene;

(f) means for rendering the two-dimensional representation of the scene on a display at a first observer perspective; and (g) means for rendering the three-dimensional representation of the scene on the display containing the lower resolution polygonal feature when the scene is viewed from a second observer perspective closer than the first observer perspective.

14. The apparatus of claim 13 further comprising:
means for removing inserted polygons having a particular feature code from said polygonal representation of scene to create a reduced polygon representation; and
means for storing said reduced polygonal representation of said scene in a data base for rendering in real time.

15. The apparatus of claim 13 further comprising:
means for removing coplanar polygons from said polygonal representation of scene to create a reduced polygon representation; and means for storing reduced resolution data sets of said reduced polygonal representation of said scene in a data base for rendering in real time.

16. The apparatus of claim 13 wherein means (b) further comprises means for systematically rendering an orthographic projection of the scene containing high resolution models.

17. The apparatus of claim 16 further comprising:
means for removing inserted polygons from said polygonal representation of scene to create a reduced polygon representation.

18. The apparatus of claim 17 further comprising:
means for storing said reduced polygonal representation of said scene in a data base for rendering in real time.

19. The apparatus of claim 16 further comprising:
means for removing inserted polygons having a particular feature code from said polygonal representation of scene to create a reduced polygon representation.

20. The apparatus of claim 18 further comprising:
means for storing said reduced polygonal representation of said scene in a data base for rendering in real time.

21. A system of interconnected programmed computer processors for building a database for real time rendering of a scene comprising:

(a) a first computer processor with storage and including processes for substituting a high-resolution polygonal feature model generated from vector data as a feature into three-dimensional scene source imagery in place of a lower resolution polygonal representation of the feature, processes for systematically rendering a two-dimensional scene of the scene source imagery containing said high-resolution model, processes for capturing a two-dimensional pixel representation of said rendered scene containing said high-resolution model, processes for removing the high resolution models inserted into the scene source imagery and substituting the lower resolution polygonal representation of the feature into the scene source imagery; and (b) a second computer processor with storage and including processes for storing said two-dimensional pixel representation of said rendered scene containing said high-resolution model in a database for real time rendering of said scene; and (c) a third computer processor with storage and including processes for rendering the two-dimensional representation of the scene on a display viewed from a first perspective and rendering the three-dimensional representation of the scene on the display containing the lower resolution polygonal feature when the scene is viewed from a second observer perspective closer than the first observer perspective.

22. The system of claim 21 wherein the first processor further comprises processes for systematically rendering an orthographic projection of reduced resolution data sets of said scene containing high resolution models.

23. A computer processor for building a database for real time rendering of a scene comprising a polygonal representation having coplanar polygons and feature identification codes for polygons comprising:

(a) a programmed computer processor with storage and including processes for inserting a high-resolution polygonal feature model generated from vector data as a feature into three-dimensional scene source imagery in place of a lower resolution polygonal representation of the feature, processes for systematically rendering a two-dimensional representation of said scene containing said high-resolution model, processes for capturing the two-dimensional pixel representation of said rendered scene containing said high-resolution model, processes for removing the inserted feature model inserted into the scene source imagery;

(b) data storage memory for storing said two-dimensional pixel representation of said rendered scene containing said high-resolution model in a database for real time rendering of said scene; and (c) a programmed computer processor with storage and including processes for rendering the two-dimensional representation of the scene on a display viewed at a first observer perspective and alternately rendering the three-dimensional representation of the scene on the display when the scene is viewed from a second observer perspective closer than the first observer perspective.

24. The computer processor of claim 23 wherein the programmed computer processor further comprises process for removing inserted polygons having a particular feature code from said polygonal representation of scene to create a reduced polygon representation; and process for storing said reduced polygonal representation of said scene in a data base for rendering in real time.

25. The computer processor of claim 23 wherein the programmed computer processor further comprises process for removing coplanar polygons from said polygonal representation of scene to create a reduced polygon representation; and process for storing lower resolution data sets of said reduced polygonal representation of said scene in a data base for rendering in real time.

26. The computer processor of claim 23 wherein the programmed computer processor further comprises a process for systematically rendering an orthographic projection of the scene containing high resolution models.

27. The computer processor of claim 26 further comprising:

process for removing inserted polygons from said polygonal representation of scene to create a reduced polygon representation.

28. The computer processor of claim 27 further comprising:

process for storing said reduced polygonal representation of said scene in a data base for rendering in real time.

29. The computer processor of claim 26 further comprising:

process for removing inserted polygons having a particular feature code from said polygonal representation of scene to create a reduced polygon representation.

30. The computer processor of claim 28 further comprising:

process for storing said reduced polygonal representation of said scene in a data base for rendering in real time.

* * * * *